United States Patent
Gehlen

(10) Patent No.: US 9,026,264 B2
(45) Date of Patent: May 5, 2015

(54) SYSTEM FOR IDENTIFICATION PROVIDED BY USERS IN VEHICLES

(71) Applicant: Vodafone Holding GmbH, Düsseldorf (DE)

(72) Inventor: Guido Gehlen, Neuss (DE)

(73) Assignee: Vodafone Holding GmbH, Dusseldorf (DE)

( * ) Notice: Subject to any disclaimer, the term of this patent is extended or adjusted under 35 U.S.C. 154(b) by 104 days.

(21) Appl. No.: 13/974,574

(22) Filed: Aug. 23, 2013

(65) Prior Publication Data

US 2014/0067156 A1 Mar. 6, 2014

(30) Foreign Application Priority Data

Sep. 4, 2012 (EP) .................................... 12182956

(51) Int. Cl.
| | | |
|---|---|---|
| *G05D 1/00* | (2006.01) | |
| *G06F 7/00* | (2006.01) | |
| *G08G 1/01* | (2006.01) | |
| *G08G 1/00* | (2006.01) | |

(52) U.S. Cl.
CPC .. *G06F 7/00* (2013.01); *G08G 1/01* (2013.01); *G08G 1/20* (2013.01)

(58) Field of Classification Search
CPC ..................... H04M 2207/18; H04M 2242/14; H04M 3/53; H04W 4/02; H04W 4/021; H04W 4/027; H04W 64/00; H04W 8/245; G07C 5/008; G07C 5/085; G08G 1/20; G08G 1/0112; G08G 1/0129; H04L 29/12009; H04L 67/04; H04L 67/2842; G06Q 30/0261; G06Q 50/01
USPC ............................................................ 701/1
See application file for complete search history.

(56) References Cited

U.S. PATENT DOCUMENTS

2011/0195699 A1* 8/2011 Tadayon et al. ............... 455/418

* cited by examiner

*Primary Examiner* — Bhavesh V Amin
(74) *Attorney, Agent, or Firm* — International IP Law Group, PLLC

(57) ABSTRACT

The techniques described herein include a system for determining the number and the identity of users in a vehicle, and to a method for operating this system. The system comprises a vehicle with a vehicle identification (ID) and a vehicle module for the wireless transmission of vehicle-specific data. The system includes a mobile network including a network server and mobile terminals having terminal IDs, wherein users of the mobile terminals are identifiable via the terminal ID. The network server is configured to transmit terminal-specific data to the system. The system includes a database for storing the vehicle-specific and terminal-specific data and for ascertaining individual travel routes and movement routes for the specific vehicles and terminals. The system includes an analysis server that is configured to compare the individual travel routes to the individual movement routes and link a vehicle ID with the terminal IDs belonging to the movement routes.

15 Claims, 5 Drawing Sheets

SYSTEM FOR IDENTIFICATION PROVIDED BY USERS IN VEHICLES

CROSS REFERENCE TO RELATED APPLICATION

This application claims priority to European (EP) Patent Application No. 12182956.8 filed on Sep. 4, 2012, the contents of which are incorporated by reference as if set forth in their entirety herein.

BACKGROUND

Vehicles can be driven by different drivers. By the same token, different persons can be transported in a vehicle, even if these persons themselves are not the driver. For numerous purposes and applications, it is important to know which driver is driving a specific vehicle and/or which persons in this specific vehicle are being transported as passengers. For example, a car rental company can prescribe a specific driver or group of drivers for a given rental vehicle, so that the vehicle can only be driven by authorized persons who hold a driver's license and by persons who drive with due care. Therefore, it would be desirable if the car rental company could check whether its requirements are actually being complied with. Determining who the driver is can also be helpful, for example, for investigating traffic accidents involving these vehicles. In another example, an insurance company could be interested in ascertaining which specific persons in a vehicle drove which miles. Furthermore, in order to initiate emergency responses, for example, after accidents, it would be desirable if the emergency dispatcher could quickly obtain information about the number of persons in the vehicle.

German utility model DE 20 2008 013 951 U1 discloses electronic tachograph recording on the basis of position data (for example, GPS data) that is transmitted from a vehicle to a server via a wireless network connection. However, this does not make it possible to ascertain how many and which persons are in the vehicle. A known approach is to install weight sensors under the vehicle seats in order to determine whether a seat in the vehicle is being occupied by a person. However, these sensors cannot determine the identity of the person.

U.S. Pat. No. 5,945,919 discloses a system with which the positions of a plurality of vehicles are monitored and, in each case, the vehicle that is nearest to the location of a given customer is allocated to this customer so that it can provide a service for that person. One example includes vehicles that are being driven for a taxi company. As soon as a customer requests a taxi in the system, the nearest vehicle to this customer is sent to pick him/her up. In this process, neither the identity of the customer nor the ultimate number of passengers in this taxi is ascertained. Thus, the system does not automatically know which persons and how many persons are in the taxi.

German patent application DE 101 19 244 A1 discloses a method for arranging and monitoring a trip by travelers. Here, a determination is made of the position of a vehicle that is driving along a certain route and the position of a possible traveler who would like to get into this vehicle in order to get a ride. In order to match travelers with drivers of certain vehicles who are willing to provide a ride, the driver and the traveler have to identify themselves personally. Consequently, with this method, the identities of the persons involved are known right from the start. However, this method can only be used for persons who have identified themselves personally ahead of time. In particular, the vehicle is automatically associated with a specific driver who is known to the system, and the system then offers a traveler who is known to the system as someone who would like to ride with that driver. If the arrangement is made, then the driver and the traveler are already determined ahead of time. Here, any other persons who might be traveling along in the vehicle cannot be identified. Likewise, it cannot be ascertained whether the driver indicated in the system is indeed the actual driver.

Drivers or passengers can be identified, for example, via iris scanners, fingerprint sensors or other identification techniques that are installed in the vehicle. However, for one thing, this presupposes the installation of special sensors in the vehicle as well as the availability of additional unusual and very specific data pertaining to the identification of persons. This greatly complicates the effort needed to identity persons.

Therefore, it is desirable to have a system and a corresponding method with which the number and the identity of any persons in a vehicle can be identified without any involvement on the part of these persons and with only slight modifications to the vehicle. It is especially desirable to determine whether the vehicle is being driven by an authorized person.

SUMMARY

The techniques described herein relate to a system for determining the number and the identity of users in a vehicle as well as to a method for operating this system.

A method and a system with which the number and the identity of persons in a vehicle can be determined with little extra effort and with sufficient reliability is described herein. In embodiments, a system for determining the number and the identity of users in a vehicle is described. The system may include a vehicle with an associated individual vehicle ID and with a vehicle module for the wireless transmission of vehicle-specific position and time data to the system. The system may include at least one mobile telecommunications network with a network server and several mobile terminals, suitable for communication at least in the mobile telecommunications network, whereby individual terminal IDs are associated with each of the mobile terminals, and the users of the mobile terminals can be identified on the basis of the terminal IDs, and the network server is configured to transmit terminal-specific position and time data to the system. The system may include one or more data storage units for storing the vehicle-specific position and time data, together with the vehicle ID, in order to ascertain the individual travel route of the at least one vehicle, and in order to store the terminal-specific position and time data, together with the terminal IDs and also personal data of the users associated with the terminal IDs in order to ascertain individual person-specific movement routes for each of the mobile terminals. The system may include an analysis server that is configured to access the one or more data storage units and to compare the ascertained individual travel route to the ascertained movement routes, and, in case of sufficient correspondence of the individual travel route with one or more of the individual movement routes, at least over a given time interval, to link the appertaining vehicle ID with the terminal IDs belonging to these individual movement routes, and to store this in the data storage unit or units, together with the personal data of the users associated with the terminal IDs.

This system makes it possible for the number and the identity of persons in a vehicle to be determined with little extra effort and with sufficient reliability. In this context, the persons are also referred to as users (of the vehicles and of the mobile terminal). The vehicle requires just one additional technical mechanism that permits the travel route of the vehicle to be determined. The vehicle can be equipped, for example, with an M2M communication module having an optional satellite navigation receiver (for example, GPS). Moreover, most vehicles nowadays are already equipped with navigation systems that permit route tracking. As an alternative, vehicles can easily be retrofitted with navigation systems. The additional component that the users need in order for their movements to be detected is a mobile terminal that is suitable for communication in a mobile telecommunications network. Nowadays, almost all users own such mobile telecommunications devices, so that the effort involved is limited to providing the analysis server and a corresponding configuration of the data connections in the system. In this process, the analysis server assumes essential functions, in particular, the various pieces of information pertaining to the time sequences of the vehicle position and of the mobile terminal position are evaluated so that users can be associated with vehicles without the need for a relationship between their identity and a vehicle having to first be established for the analysis. The system can be operated with just one vehicle or with a plurality of vehicles. After the analysis server has been set up, the system can be scaled up for any desired number of vehicles and users, without the need to install additional components. In addition, the system according to embodiments can avoid the need for control and identification devices to identify the driver/passengers in or on the vehicles such as, for example, fingerprint or eye scanners or near field sensors and, at the same time, it can be determined, at least with a high degree of certainty, whether one or more authorized persons (users) are in the vehicle and how many of these persons (users) are in the vehicle. On the basis of the movement routes, a conclusion can be drawn with high certainty as to who the actual driver is.

All kinds of vehicles can be used with the system. It merely has to be possible to determine the travel route of these vehicles. The vehicles can be, for example, vehicles of a car rental company, of a taxi company or of another transportation service provider. The person skilled in the art can suitably select the individual vehicle ID associated with a given vehicle. For example, such a vehicle ID can be the license plate number, the Vehicle Identification Number (VIN) issued by the vehicle manufacturer, or some other unambiguous designation. The vehicle module for wireless transmission of vehicle-specific position and time data can be integrated into the car body, that is to say, permanently installed, or else it can be placed into the vehicle as a retrofitted device. The vehicle module can be, for example, an M2M communication module with an optional satellite navigation receiver (for example, GPS), a navigation device, or a radio module whose position in a mobile telecommunications network can be located using familiar techniques. In a communication network, these devices can have an unambiguous designation such as, for instance, IMSI, MSISDN, sip adr, etc. These designations can likewise be used as the vehicle ID since the radio modules can be permanently installed in the vehicles. In one embodiment, the vehicle modules link the position and time data with the specific vehicle IDs before transmitting this data to the system. Hence, all vehicle-specific position and time data can be unambiguously associated with a vehicle. The vehicle-specific position and time data as well as the terminal-specific position and time data can be transmitted to the system via different components in the system. For example, the data can be received by receiving components provided for this purpose and it can then be relayed via appropriate data connections to the components in the system that carry out the further processing. In one embodiment, the data can also be received, for example, by the analysis server or relayed directly to it.

The mobile telecommunications network needed in the system can be any suitable mobile telecommunications network, for example, one of the familiar cell phone networks. As a rule, such networks have a large number of servers, one of which, as the network server, is connected to the data storage unit or units. The mobile terminals can be, for instance, commercially available mobile telecommunications devices, provided that they are designed for communication in the mobile telecommunications network. Such mobile terminals have an individual identifier so that they can be unambiguously identified in the mobile telecommunications networks and addressed for purposes of communication.

The terminal ID can be the individual phone number (MSISDN, IMEI) of the mobile terminal or it can be another unique network identifier of that particular mobile terminal in the mobile telecommunications network (for example, IMSI). The technique for locating mobile terminals in a network is known to the person skilled in the art. Consequently, the person skilled in the art can select the appropriate technology in order to receive terminal-specific position and time data in the mobile telecommunications network. This data is then transmitted, along with the terminal ID, to the system in a suitable manner, for example, via a wireless data line. The time data in the vehicle-specific and terminal-specific position and time data can be present, for example, as a time stamp. The position and time data can be periodically acquired and/or transmitted, if applicable, only during a specific time interval. The period (frequency) with which the data is acquired and/or transmitted can differ for different applications or modes of operation (for example, position and time data can be stored on the terminal and transmitted in a bundle after the trip has ended).

The data storage unit or units can be any kind of suitable data storage unit. The data storage units can be arranged, for example, in different places in the system or they can be arranged as a shared data storage unit in one place in the system. The data storage unit or units can be, for instance, one or more databases. The data storage unit or units can also be arranged, for example, in one or more servers. In the example of a database as a data storage unit for storing the vehicle-specific and terminal-specific position and time data as well as the personal data of the users associated with the terminal IDs, the database can be any database that is suitable for this purpose. The database can be configured here as a separate component in the system or else it can be part of the analysis server or of another server that is used in the system. The individual travel and movement routes can be ascertained on the basis of the particular position and time data using appropriate software. For example, the spaces between the measured position data are interpolated linearly. The resultant segment is then the ascertained travel or movement route. Since the vehicles generally move on known streets and roads, the interpolation between the measured position data can also be linked to available map material in such a way that the interpolated segments run along regular roads or streets. The travel and movement routes can be ascertained in the same component of the system or else in separate components of the system, for example, there can be one component for ascertaining the travel route and another component for ascertaining the movement route. In one embodiment, all of the routes are ascertained by the analysis server.

The analysis server compares the ascertained individual travel routes to the ascertained movement routes. In this process, aside from the position data, the time data is also used. A user can only be in a vehicle if he/she is at the same place as the vehicle not only at some point in time, but rather if he/she is at the same place as the vehicle at the same time. A user can also be associated with a vehicle if his/her individual movement route displays a sufficient correspondence with the movement route of the vehicle in terms of time and position for both of them, at least during a certain time interval. In order for the correspondence to be sufficient to make this association, the travel and movement routes have to coincide over a time interval that is not too short, since otherwise, this would merely be a coincidental convergence, without the user having been in the vehicle at some time during that particular movement route. Since, as a rule, the position and time data is present as discrete position-time points, the route can be ascertained by interpolation between the points. Since the position-time points for the travel routes and for the movement routes are generally measured at different points in time, as a rule, the interpolated segments do not coincide completely. Therefore, for each of the combinations of the travel route and the movement route that are to be tested, a probability for the correspondence is ascertained, which is also referred to as the degree of correspondence. If the probability (degree of correspondence) is above a predefined value (threshold value), then this is interpreted in the system as sufficient correspondence. In one embodiment, a threshold value for a sufficient correspondence is defined in the system. The correspondence is only sufficient if the ascertained degree of correspondence is above the threshold value. The definition of the threshold value can be modified in the system as a function of the number of users and vehicles. In a preferred embodiment, when it comes to ascertaining the degree of correspondence, the time and position correspondence of the starting and ending points of the individual travel route and the individual movement routes that are to be compared to it are given a higher weighting than points of the travel and movement routes between the starting and ending points. This corresponds to the principle, for example, that a user of the vehicle has to actually be in the vehicle for the entire distance in order to be considered as a driver of the vehicle.

As soon as the analysis server has determined a sufficient correspondence for a certain combination of travel routes and movement routes, the analysis server links that particular vehicle ID with the terminal ID belonging to these individual movement routes, and it stores the link in the data storage unit or units, together with the personal data of the users associated with the terminal IDs. For this purpose, it is not necessary to first extract the personal data from the data storage unit in the analysis server. In the data storage unit or units, the links with the appertaining data records, comprising personal data and the terminal ID, could be linked. It would also be possible to create an additional data record consisting of the linking and the personal data in the data storage unit or units.

In one embodiment, the system comprises a vehicle server which is connected at least to the data storage unit or units and on which at least the drivers and/or passengers that are authorized for the at least one vehicle are stored. In this manner, the system can use already-existing technical infrastructure without the need for far-reaching changes, since this data can continue to be kept available decentrally without this having an influence on the functionality of the system.

In one embodiment, the vehicle module transmits the position and time data to the vehicle server, and the individual travel route of the at least one vehicle is determined by the vehicle server. Thus, the local position monitoring of the vehicles that might already exist for some participants in the system can continue to be operated and can be used in the system. For example, the vehicle server can transmit the already ascertained travel routes so that the analysis server merely has to ascertain the movement routes in order to perform the comparison.

In one embodiment, the vehicle server is configured so that the users associated with at least one vehicle via the analysis server can be compared to the drivers and/or passengers authorized for this vehicle, after which the vehicle server can then store the result of the comparison and, in case of a correspondence between only one of the associated users with one of the authorized drivers and/or passengers for the vehicle, to indicate this one user as the driver of this vehicle. If several persons or users are authorized as drivers of a vehicle, then these persons or users are either drivers or passengers with equal probability. The comparison of the routes in the analysis server can identify an unambiguous driver. However, it could also be the case that two authorized persons are in the vehicle for the entire travel route, so that the driver ascertained from the probability comparison might only be the passenger. If an unambiguous determination of the driver should be necessary, then both users would have to be queried. If only one of the associated users matches one of the authorized drivers and/or passengers for this vehicle, then the system can automatically and unambiguously identify the driver of a given vehicle.

In another embodiment, the vehicle server is designed to send a first alarm signal to the system if there is no correspondence between associated users and authorized drivers and/or passengers, or if there is not a sufficient correspondence with individual movement routes for this vehicle. In both cases, an unauthorized user (person) is driving the vehicle. In the first case, at least persons known to the system can be ascertained, who can then be contacted by the system operator about their behavior. Therefore, the system operators can determine in a simple and fast technical manner whether the users of the vehicles are complying with the agreed-upon rules. In the second case, it could even be a matter of a car theft. Since both of these cases involve unwanted behavior, the system operators are automatically notified of this behavior with the first alarm signal and appropriate further steps can be promptly initiated. In case of theft, there is no longer a need to wait until the authorized driver or passenger reports the theft, since, thanks to the system described herein, the information is available directly to the system operator without any action on the part of other persons. The time gained can be used to successfully apprehend the thief.

In another embodiment, the vehicle server is designed so that, if there are several correspondences between associated users and authorized drivers and/or passengers for this vehicle, the user whose individual movement route displays the greatest level of correspondence with the individual travel route of the vehicle is indicated as the driver. Thus, through this indication, it can be documented that at least one authorized driver was in the vehicle.

In one embodiment, the mobile telecommunications network is configured to trigger the transmission of terminal-specific position and time data from the mobile terminals to the network server, for example, by paging or sending so-called silent SMSs. The triggering by the mobile telecommunications network ensures that a sufficient volume of position and time data is available for ascertaining a movement route. In this context, the interval of the notifications can be, for example, less than a minute, between one and five minutes, or between one and ten minutes so that a precise movement route can be ascertained.

In an alternative embodiment, an application is installed on the mobile terminal that triggers the transmission of terminal-specific position and time data to the network server. In this manner, the individual users themselves can specify the time interval between the individual position measurements and, if desired, can set a shorter measuring period in order to more precisely ascertain the movement route. Moreover, the position measurement takes place independently of the circumstances in a given mobile telecommunications network. As an alternative, the triggering can also be carried out by the user manually, for example, by actively sending an SMS or by making phone calls. This data can, of course, be added to the other regularly obtained position data. The time data can be present in the form of a so-called time stamp.

In one embodiment, the vehicle module is connected to an engine control unit of the vehicle and it transmits the vehicle-specific position and time data only while the engine is running. In an alternative embodiment, the vehicle module is connected to the car battery in a suitable manner so that the start or end of a trip is detected by monitoring the car battery voltage. Then, for example, when the engine is started up, the transmission of the vehicle-specific position and time data to the vehicle server or to the analysis server begins. When the engine is switched off, the transmission of the vehicle-specific position and time data to the vehicle server or to the analysis server ends. In this manner, on the one hand, the data traffic and the data volume to be processed are limited and, on the other hand, this embodiment simplifies the analysis by the analysis server, since data on movement routes while the vehicle is at a standstill does not have to be taken into account.

In one embodiment, driving data is acquired from the vehicle-specific position and time data and/or the vehicle is equipped with one or more driving sensors, preferably acceleration sensors, that send the driving data to the vehicle module, and the vehicle module transmits this driving data, together with the appertaining position and time data, to the system. The driving data or some of the driving data can be acquired not only from the driving data of the driving sensors, but also from the GPS data that is already present as vehicle-specific position and time data. Based on the transmitted driving data, the system operators can check, for example, if the driving style of a driver is to be viewed as risky, dangerous or unsafe. For example, the prescribed speed limits over the proposed travel route can be ascertained and compared to the driving data. Thus, if the driver is driving too fast, accelerating or braking too strongly, the driver can be made aware of his/her driving style. The transmitted driving data can also be linked to available map material in order to permit an even more reliable assessment of the driving style of the driver. Therefore, for instance, a high or excessive speed at typical dangerous places in traffic or, for example, on curvy roads, can be assessed as being a highly risky driving style. Whether or not a given speed on a certain street or road section is excessive can be determined, for example, by making a comparison with the speed limits stored in the analysis server or in the vehicle server for the street or road section in question. Thus, in addition to the map material, the applicable speed limits for the individual street or road sections can be stored and this can be consulted to assess the driving style of the driver, by using this information and/or by comparing it to the ascertained vehicle-specific position and time data.

In another embodiment, for example, during longer trips, it can also be determined whether a certain driver adheres to the desirable and/or mandatory rest periods during the trip. The transmitted time data or the driving time and the driver identity can be compared to a prescribed maximum driving time and, if this time is exceeded, the analysis server or the vehicle server can transmit warnings to predetermined users, for example, the driver or other registered users of the system.

In another embodiment, the analysis server and/or the vehicle server are configured to associate the driving data with the user who has been identified as the driver, to collect the driving data for all trips of this user, to determine a specific driving behavior for the user on the basis of the collected driving data, and to use the specific driving behavior to identify a specific user as the driver from among a group of several users who could possibly be the drivers and/or to verify the identification of one of the users as the driver. Consequently, the system is a self-teaching system that autonomously expands and updates the database for determining user-specific driving behavior, as a result of which, when there are several users as possible drivers, a more precise identification of a user as the driver can be made on the basis of similar correlations such as, for example, their movement routes with the travel route, or can be made on the basis of their characteristic driving behavior. The collection of the driving data, the determination of characteristic driving behavior on the basis of the collected driving data, and the comparison between the driving behavior and individual items of driving data can be carried out by different components of the system.

The techniques described herein also relate to a method for operating the system according to the embodiments described herein. The method includes at least one vehicle with an associated individual vehicle ID and with a vehicle module, comprising at least one mobile telecommunications network with a network server and several mobile terminals that are suitable for communication at least in the mobile telecommunications network, comprising one or more data storage units and an analysis server, comprising the following steps:

registering authorized drivers and/or passengers in the system with personal data and terminal IDs for the mobile terminals of the drivers and/or passengers, transmitting vehicle-specific position and time data to the system via the vehicle module, transmitting terminal-specific position and time data via the network server to the system, whereby individual terminal IDs are associated with each of the mobile terminals, and the users of the mobile terminals can be identified on the basis of the individual terminal IDs, storing the vehicle-specific position and time data, together with the vehicle ID for the at least one vehicle, and storing the terminal-specific position and time data, together with the terminal IDs as well as the personal data of the users associated with the terminal IDs for each of the mobile terminals, in one or more data storage units, ascertaining the individual travel route and the individual person-specific movement routes on the basis of the stored vehicle-specific position and time data and of the terminal-specific position and time data, comparing the ascertained individual travel route to the ascertained movement routes in an analysis server, linking the vehicle ID of the at least one vehicle to one or more terminal IDs in case of a sufficient correspondence—at least during a certain time interval—between the individual travel route associated with the vehicle ID and the individual movement routes associated with the one or more terminal IDs, and storing the linking of the vehicle ID with the terminal IDs, together with the personal data of the users associated with the terminal IDs, in the data storage unit or units.

The registration step can serve to establish the correlation between personal data of drivers and passengers and their terminal IDs. The movement routes of terminals that cannot be associated with any person are useless for checking the persons in a vehicle.

One embodiment of the method comprises the following additional steps:

storing authorized drivers and/or passengers for the at least one vehicle in a vehicle server that is at least connected to the data storage unit or units, comparing the users of this vehicle that have been associated by the analysis server with the drivers and/or passengers authorized for this vehicle, and storing the result of the comparison.

Another embodiment of the method comprises the following additional steps:

in case there is a correspondence of only one of the associated users with one of the authorized drivers and/or passengers for this vehicle, the vehicle server indicates this one user as the driver of this vehicle, in case there is not a correspondence between associated users and authorized drivers and/or passengers or not a sufficient correspondence with individual movement routes for this vehicle, a first alarm signal is sent to the system, or in case there are several correspondences between associated users and authorized drivers and/or passengers for this vehicle, the user whose individual movement route displays the greatest correspondence with the individual travel route for the vehicle is indicated as the driver of this vehicle.

The indication can be made in any suitable manner. For example, the data record of the authorized driver or the data record of the appertaining user can be suitably marked by setting a flag, by adding the applicable time period during which a correspondence between the travel route and the movement route was ascertained, or else by creating a new data record in which the drivers indicated for the appertaining vehicles and driving times are listed.

Another embodiment of the method in which the vehicle is equipped with one or more driving sensors, preferably acceleration sensors, that transmit the driving data to the vehicle module, and the vehicle module then transmits this driving data, together with the applicable position and time data, to the system, comprises the following additional steps:

analyzing the driving data in the vehicle server or in the analysis server to check whether the previously defined maximum values have been exceeded, and associating the driving data and, if applicable, any instances that the maximum value was exceeded, with the driver indicated for this vehicle.

In another embodiment, the method comprises the following additional steps:

analyzing the driving data in the vehicle server or in the analysis server, and associating the driving data with the driver indicated for this vehicle.

In a preferred embodiment, the method additionally comprises other steps, namely, that the associated driving data is collected for the identified user as the driver for all trips of this user and, on the basis of the collected driving data, a specific driving behavior is determined for the identified user, whereby the specific driving behavior is used to identify one of the users as the driver (in case of several users as possible drivers) and/or to verify the identification of one of the users as the driver. For example, these processes can be carried out in the vehicle server and/or in the analysis server. The above-mentioned method steps can also be carried out in the reverse order. For example, the driving data can be acquired from the vehicle-specific position and time data. As an alternative or in addition, the vehicle can also be equipped with one or more driving sensors, for example, acceleration sensors, that send the driving data to the vehicle module, after which the vehicle module transmits this driving data, together with the associated position and time data, to the system.

The analysis of the driving data can also comprise a procedure to check whether previously defined maximum values have been exceeded, which are likewise associated with the identified driver. In a preferred embodiment, one of the maximum values is a maximum negative acceleration, whereby the vehicle server sends a second alarm signal to the system if this maximum negative acceleration is exceeded, whereby the second alarm signal encompasses the users associated with this vehicle and, if applicable, the indicated driver. The maximum values for negative accelerations can correspond, for example, to those that deploy the airbags in vehicles. These negative accelerations can be interpreted as an accident situation. Thus, if such an acceleration value is ascertained, an accident of the vehicle can be detected. In response to the received second alarm signal, the system operator is able to inform suitable emergency services or the police in order to initiate further emergency and rescue measures. In addition, the emergency services can be given additional information such as, for example, the number of persons (corresponds to the number of associated users for the travel route) in the vehicle as well as the identity of the driver for this vehicle.

BRIEF DESCRIPTION OF THE DRAWINGS

These and other aspects of the present innovation are presented in detail in the figures, which show the following.

DETAILED DESCRIPTION OF SPECIFIC EMBODIMENTS

Figure 1:
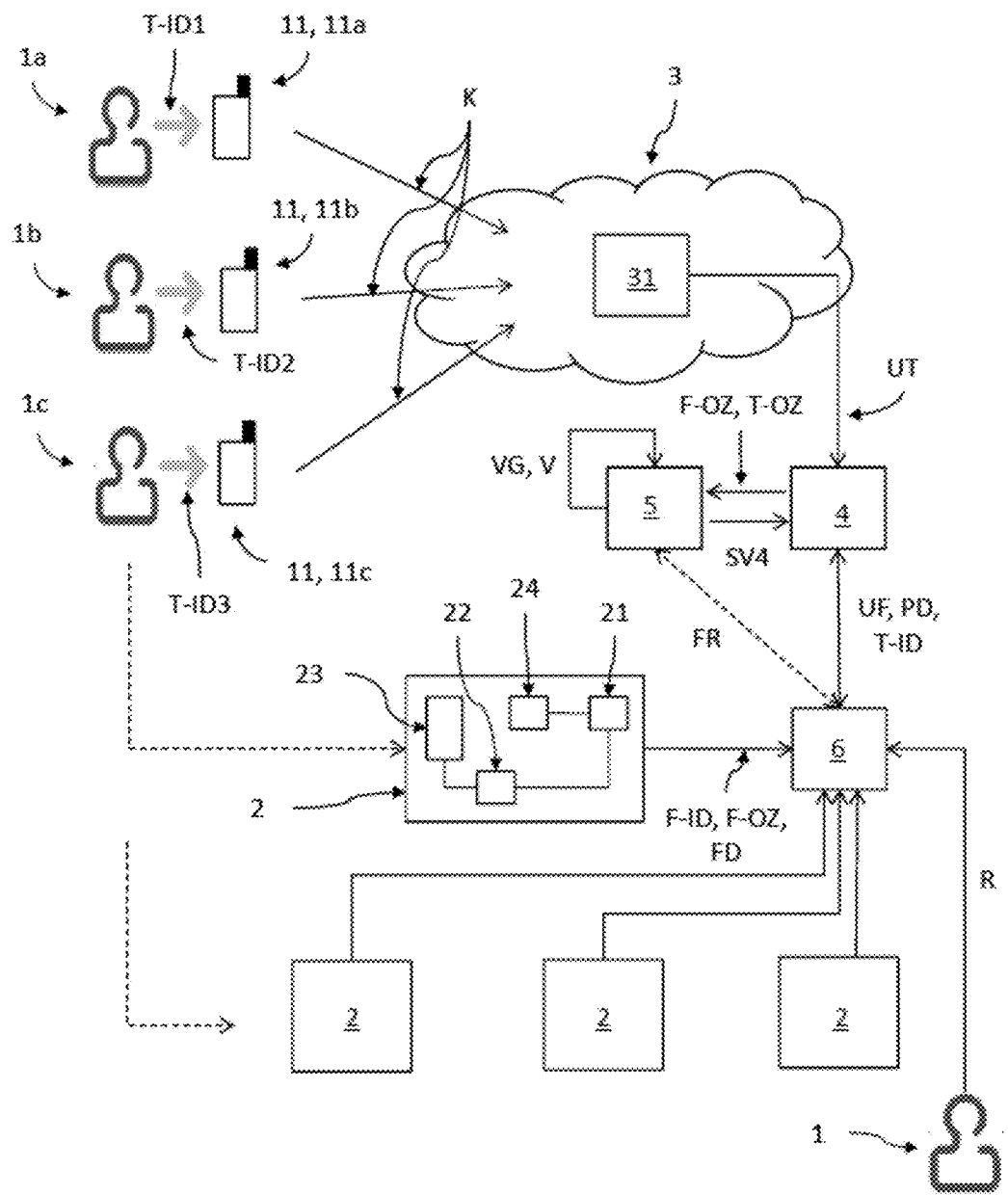
FIG. 1 illustrates the system according to embodiments described herein.

FIG. 1 illustrates the system according to embodiments described herein. The system comprises several vehicles 2, of which one vehicle 2 is shown in greater detail with several components. Individual vehicle IDs are associated with the vehicles 2 for purposes of identification in the system. The vehicles 2 are equipped with a vehicle module 21 for the wireless transmission of vehicle-specific position and time data F-OZ to the system. In this embodiment, the position and time data F-OZ is transmitted to the vehicle server 6. Here, before the transmission to the vehicle server 6, the vehicle modules 21 link the position and time data F-OZ to the individual vehicle IDs F-ID, in that the vehicle modules 21 have an unambiguous designation associated with the vehicle server 6 in the communication network. The vehicle module can be, for instance, an M2M communication module with an optional satellite navigation receiver (for example, GPS), a navigation device, or a radio module whose position in a mobile telecommunications network can be located through familiar techniques, and they are optionally installed into a given vehicle as a retrofitted device. The M2M device has, for example, a mobile telecommunications module, an acceleration sensor and a GPS location module. The vehicle-specific position and time data F-OZ is detected, for example, with GPS or via a cell ID of the mobile telecommunications network and subsequently transmitted to the car server via the mobile telecommunications module. The transmission can take place, for example, via an IP connection via a GPRS, via SMS or, as is the case with an eCall, with an in-band modem. The acceleration sensor is not absolutely necessary to associate a vehicle to a user, but it can be used for the acquisition of additional data and can thus provide an indication of the identification of the driver. The vehicle module can also comprise an on-board diagnostic (OBD) interface and can be used as an M2M device, for example, in an OBD diagnosis connector in the vehicle. The vehicle module can have an unambiguous designation such as, for instance, IMSI, MSISDN, sip adr, etc. in a communication network. These designations can likewise be used as the vehicle ID since the radio modules can be permanently installed in the vehicles. In one embodiment, the vehicle modules link the position and time data to the specific vehicle IDs before transmitting this data to the system. As an alternative, the vehicle-specific position and time data F-OZ can be stored in the vehicle module 21 and can be transmitted or transferred to the system after the trip has ended.

In this embodiment, the vehicle module 21 is additionally connected to an engine control unit 22 of the vehicle 2 so that the vehicle-specific position and time data F-OZ is only transmitted to the vehicle server 6 while the engine 23 is running. As an alternative, the vehicle module 21 can, for example, be connected to the car battery in a suitable manner so that the start or end of a trip is detected by monitoring the car battery voltage. Other detection possibilities are also conceivable in order to determine the start or end of a trip such as, for example, using an acceleration sensor.

In this manner, the monitoring of the vehicle 2 for determining the driver F is limited to the time during which a driver F is actually in the vehicle 2. In this embodiment, the vehicle 2 additionally has one or more driving sensors 24, preferably acceleration sensors 24, that send the driving data FD to the vehicle module 21 during operation of the vehicle, after which the vehicle module 21 sends this driving data FD, together with the associated position and time data F-OZ, to the vehicle server 6. In this manner, the driving style of the driver F or any dangerous situations that might occur can be automatically recognized and appropriate measures can be initiated by the system operators. Moreover, several mobile terminals 11, here shown by way of example as three mobile terminals 11a, 11b, 11c, are connected in a mobile telecommunications network 3, among other things, to a network server 31. Each of the mobile terminals 11a, 11b, 11c is unambiguously associated—on the basis of individual terminal IDs T-ID1, T-ID2, T-ID3—with the users 1a, 1b, 1c of these mobile terminals 11a, 11b, 11c. Therefore, the users 1a, 1b, 1c can be identified on the basis of the terminal IDs T-ID1, T-ID2, T-ID3. The localization of mobile terminals 11 in a mobile telecommunications network 3 is already known technology. The terminal-specific position and time data T-OZ can be acquired, for example, in that the mobile telecommunications network 3 triggers the transmission K of terminal-specific position and time data T-OZ from the mobile terminals 11a, 11b, 11c to the network server 31. As an alternative to this, an application could also be installed on the mobile terminals 11 that triggers the transmission K of terminal-specific position and time data T-OZ to the network server 31.

The mobile terminal 11 can transmit the terminal-specific position and time data T-OZ, for example, via an IP connection, an SMS or an in-band modem to the system or to a component of the system, that is to say, for instance, the vehicle server, the analysis server, the network server, or the database. Here, the terminal-specific position and time data T-OZ can also be acquired from GPS data or cell ID data.

The terminal-specific position and time data T-OZ can also be acquired by a different use of the mobile terminal. For example, if a cell phone serves as the mobile terminal, then the position and time data T-OZ can be transmitted during normal use of the cell phone such as, for instance, sending SMSs, making phone calls or surfing on the Internet. In this embodiment, the network server 31 is configured to transmit UT terminal-specific position and time data T-OZ to the database 4 that serves as the data storage unit. The database 4 stores the transmitted vehicle-specific position and time data F-OZ, together with the vehicle IDs F-ID, optionally for later ascertaining ER individual travel routes FR for the specific vehicles 2. The individual travel routes FR of the specific vehicles 2 can be determined by the vehicle server 6 and transmitted to the analysis server 5 for further processing (broken line arrow). In an alternative embodiment, the analysis server itself can also ascertain ER the travel routes FR. The database 4 also stores the terminal-specific position and time data T-OZ together with the terminal IDs T-ID, T-ID1, T-ID2, T-ID3 as well as the personal data PD of the users 1, 1a, 1b, 1c associated with the terminal IDs T-ID, T-ID1, T-ID2, T-ID3 in order to subsequently ascertain ER individual person-specific movement routes TR, TR1, TR2, TR3 for each of the mobile terminals 1, 1a, 1b, 1c. In an alternative embodiment, the individual movement routes TR could also be ascertained by the network server 31 and transmitted to the database 4 and/or to the analysis server 5. The analysis server 5 connected to the database 4 then compares VG the ascertained individual travel routes FR to the ascertained individual movement routes TR. In case of a sufficient correspondence U-FT of at least one of the individual travel routes FR with one or more of the individual movement routes TR, at least during a given time interval, the analysis server 5 links V the appertaining vehicle ID F-ID with the terminal IDs T-ID1, T-ID2, T-ID3 belonging to these individual movement routes TR and stores SV4 this link V in the database 4, together with the personal data PD of the users 1a, 1b, 1c associated with the terminal IDs T-ID1, T-ID2, T-ID3. The correlation between personal data PD such as, for example, first name, last name, address, identity card number, etc. and terminal IDs T-ID can be obtained from all kinds of data sources. In this embodiment, the system comprises a portal in which later users 1 can register R, so that the system operators can assign individual vehicles 2 to these users as authorized drivers (F) and/or passengers (M). During the registration, the later user 1 provides the system with at least his/her personal data PD and with the terminal ID T-ID for his/her mobile terminal 11. With this information, personal data PD can be associated with terminal IDs T-ID transmitted by the mobile telecommunications server. In another embodiment, the system can comprise a portal with which the drivers/passengers (users) can view their own travel routes and movement routes as well as others, if applicable.

Figure 2:
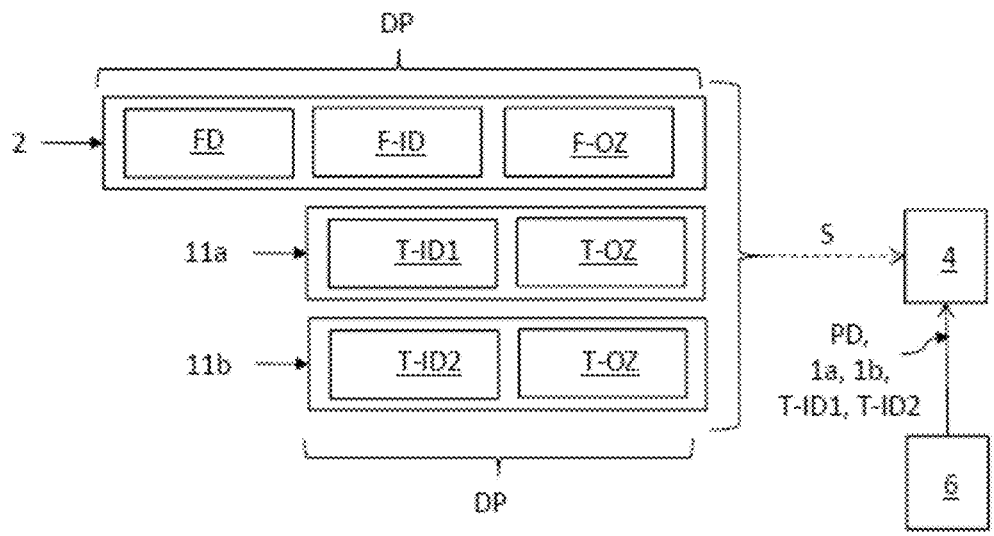
FIG. 2 illustrates an embodiment of the vehicle-specific and terminal-specific position and time data.

FIG. 2 shows an embodiment in which the vehicle-specific position and time data F-OZ is transmitted together with the driving data FD and the vehicle ID, and the terminal-specific position and time data T-OZ is transmitted, together with the terminal IDs T-ID1, T-ID2, for the individual measured points, each as a shared data packet DP (or data record DP). The data packets DP for terminal-specific position and time data T-OZ and terminal IDs T-ID1, T-ID2 are shown here by way of example for a first and a second mobile terminal 11a, 11b of a first and a second user 1a, 1b. However, as an alternative, the driving data FD can also be transmitted separately from the vehicle-specific position and time data F-OZ, so that in this case, the appropriate data packet DP would only include the vehicle-specific position and time data F-OZ and the vehicle ID. In another embodiment, for example, no driving data FD is transmitted, but rather only the vehicle-specific position and time data and/or the vehicle ID F-ID.

Figure 3:
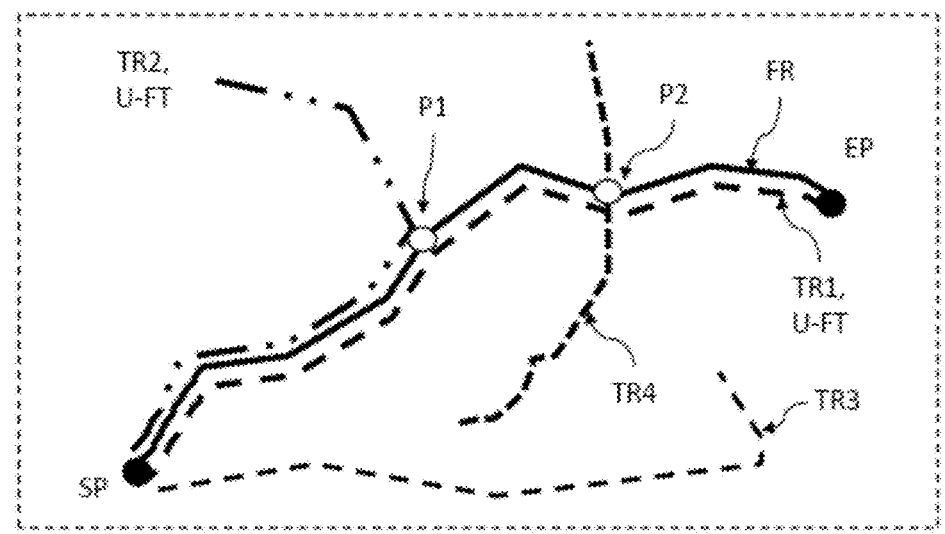
FIG. 3 illustrates a depiction of the comparison between the travel routes and the movement routes by the analysis server.

FIG. 3 shows a depiction of how different movement routes for a travel route FR are compared VG, evaluated and, if applicable, linked V, in the analysis server 5. The travel route FR is depicted here as a solid line. The dotted-line frame is to indicate a map view. For the sake of clarity, the map view is not shown in greater detail. The map view shows several movement routes TR1, TR2, TR3 that all have to be compared to the travel route FR and evaluated in order to determine the number and the identity of the users 1 in the vehicle 2. The comparison VG of the analysis server 5 involves comparing and evaluating the comparison. The travel route FR has a starting point SP. The identification of the starting point SP is obtained, for example, from the start-up of the engine 23 in the case of an engine control unit 22 or in case of a vehicle module 21 connected to the vehicle battery, or else from a manual or automatic triggering of a starting signal and from the vehicle-specific position and time data F-OZ that is thus being transmitted for the first time after a certain pause. The first measuring point with its position and time data F-OZ then corresponds to the starting point SP. The ending point EP of the travel route FR can be identified analogously to the identification of the starting point SP, in other words, for example, on the basis of the engine being switched off or on the basis of an end signal being manually or automatically triggered or the starting signal being switched off. The correspondence between the travel route FR and one or more of the movement routes TR1-TR3 has to be distinguished from coincidental convergences of some movement routes TR with the travel routes FR. In order for the correspondence to be sufficient U-FN for an association, the travel routes FR and movement the routes TR have to coincide over a time interval that is not too small, since otherwise, this is merely a coincidental convergence, without the user 1 having temporarily been in the vehicle on the movement route TR3 in question. Since the position and time data F-OZ, T-OZ cannot be present continuously, but rather can only be present as discrete position-time points (for example, SP, . . . P1, . . . , P2, . . . , EP), the route can be ascertained by interpolation between the points. Since the position-time points for the travel routes FR and for the movement routes TR can generally be measured at different points in time, as a rule, the interpolated segments will not coincide completely. Therefore, a probability for the correspondence is ascertained for each of the combinations of travel route and movement route that are to be tested. If the probability is above a predefined value (threshold value SW), then this is interpreted as a sufficient correspondence in the system. In the system, such a threshold value SW is defined for the degree of correspondence and this is stored for the analysis server 5 or else stored directly in the analysis server 5. The correspondence is only recognized by the analysis server 5 as being a sufficient correspondence with the travel route U-FT if the degree of correspondence is above the threshold value SW. In order to achieve a better analysis of the degree of correspondence, the time and position correspondence of the starting and ending points SP, EP of the individual travel route FR and the individual movement routes TR1, TR2, TR3 that are to be compared thereto can be taken into consideration with a higher weighting than, for example, the points P1, P2 along the travel routes and movement routes FR, TR1, TR2, TR3 between the starting and ending points SP, EP. In the case of the travel route TR1, the highest degree of correspondence with the travel route FR is determined by the analysis server 5 in the comparison VG. Here, the travel route and the movement route TR1 coincide between the starting and ending points SP, EP, whereby the movement route TR1 encompasses the starting point SP as well as the ending point EP, that is to say, the position data of the movement route TR1 was the same at the time of the starting point. The same applies to the ending point EP. In contrast, the starting point SP of the travel route TR3 is the same as that of the travel route FR, but over its further course, the travel route TR3 (shown by the broken line) differs completely from the travel route FR, so that a comparison VG of the correspondence would yield a probability below the threshold value SW, in response to which the analysis server 5 does not associate the movement route TR3 with the travel route FR and consequently, does not make a link between the vehicle ID F-ID and the terminal ID T-ID3 of the movement route TR3. A fundamentally identical result would be obtained from the comparison VG made by the analysis server 5 for the movement route TR4 that intersects the travel route at Point P2. Here, too, no correlation between the travel route FR and the movement route TR4 will be found by the analysis server, except at Point P2. For the movement route TR2, the comparison VG in the analysis server 5 results in a sufficient correspondence U-FT with the travel route FR for the time interval between the starting point SP and the point P1. Here, an overall probability for the entire movement route TR2 would lie below the threshold value SW. Apparently, the user who can be associated with the movement route TR2 was in the vehicle during the travel route FR between the starting point SP and the point P1, since the position data as well as the time data T-OZ for TR2 correlate with the vehicle-specific position and time data F-OZ. In order to be able to ascertain such time-limited correspondences, the probabilities are calculated section-wise, and a jump in the probability, for example, from a lower to a higher value or vice versa (as is the case here), is recognized as a starting point or ending point of a correlation, and the terminal ID T-ID2 of this movement route TR2 is associated, at least in the correlating time span, with the travel route FR, and accordingly, the vehicle ID is linked with the terminal ID by the analysis server 5, preferably indicating the correlating time interval (the correspondence during this time interval is greater than the threshold value SW). In order to prevent coincidental convergences from being linked, a minimum length can be defined for the time interval in the system, for example, in the analysis server, during which the calculated probability lies above the threshold value. Such a minimum length of the time interval can be, for example, 5 minutes or more.

Figure 4:
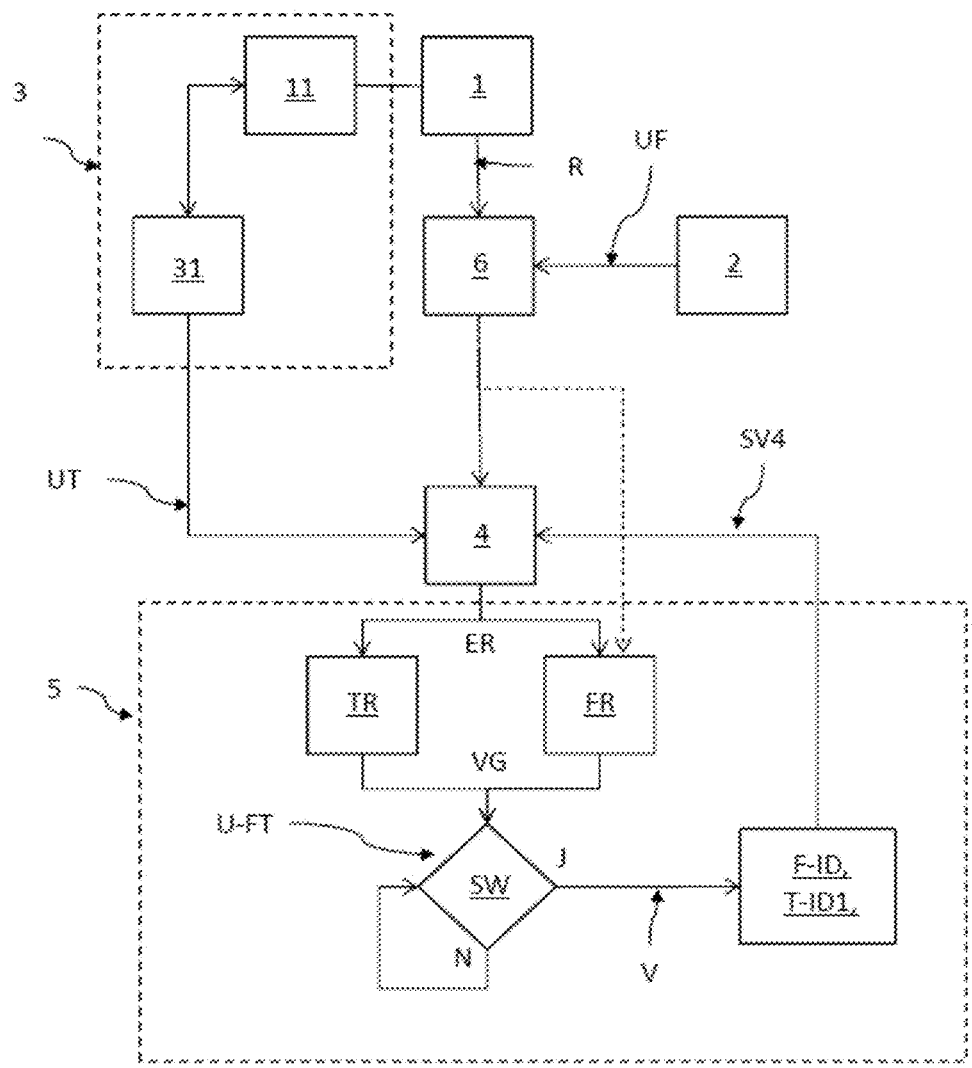
FIG. 4 illustrates a method according to embodiments described herein.

FIG. 4 illustrates a method according to embodiments described herein. In the method, users 1 register R with their personal data PD and with their terminal IDs T-ID for the mobile terminal 11 in the vehicle server 6 so that they can be considered as authorized potential drivers F and/or passengers M. Users 1 can register as belonging to a certain group of users, for example, belonging to a certain company, or as a family member of a certain family. The method can then only be used for the individual members of this group of users. Moreover, the vehicle module 21 transmits UF the vehicle-specific position and time data F-OZ to the vehicle server 6. The transmission UT of terminal-specific position and time data T-OZ to the system, here to the database 4, is carried out by the network server 31 in the mobile telecommunications network 3 in which the terminals 11 can communicate. Here, each of the mobile terminals 11, 11a, 11b, 11c is associated with individual terminal IDs T-ID, T-ID1, T-ID2, T-ID3, on the basis of which the users 1, 1a, 1b, 1c of these mobile terminals 11, 11a, 11b, 11c can be identified. The vehicle-specific position and time data F-OZ, together with the vehicle IDs F-ID for each of the vehicles 2, as well as the terminal-specific position and time data T-OZ together with the terminal IDs T-ID, T-ID1, T-ID2, T-ID3, with the personal data PD of the users 1, 1a, 1b, 1c associated with the terminal IDs T-ID, T-ID1, T-ID2, T-ID3, are stored S in the database 4 for each of the mobile terminals 11, 11a, 11b, 11c. From the position and time data F-OZ and T-OZ acquired in this way from two separate sources, individual travel routes FR and individual person-specific movement routes TR, TR1, TR2, TR3, TR4 are ascertained ER. This can be ascertained ER, for example, in the analysis server 5, in the vehicle server 6 (broken line arrow) or in the network server 31. Ascertaining ER this in the analysis server 5 is shown here. The analysis server 5 then compares VG the ascertained individual travel routes FR to the ascertained movement routes TR, TR1, TR2, TR3, TR4. If this comparison VG yields a probability of the correlation of the travel route FR with the checked movement route TR that is above the threshold value SW, then the analysis server 5 links V the vehicle IDs F-ID to the terminal ID T-ID. If no correspondence has been found above the threshold value, then the method is continued with the next movement route TR, which is then compared to the same travel route FR. Once all of the movement routes TR have been compared VG to this travel route, then the method is continued with the next travel route to which all of the movement routes are then compared VG. The method is continued until all combinations of travel routes FR and movement routes TR have been compared VG. The performed procedures of linking V the vehicle IDs F-ID with the terminal IDs T-ID are stored SV4 in the database 4, together with the personal data PD of the users 1 associated with the terminal IDs T-ID.

Figure 5:
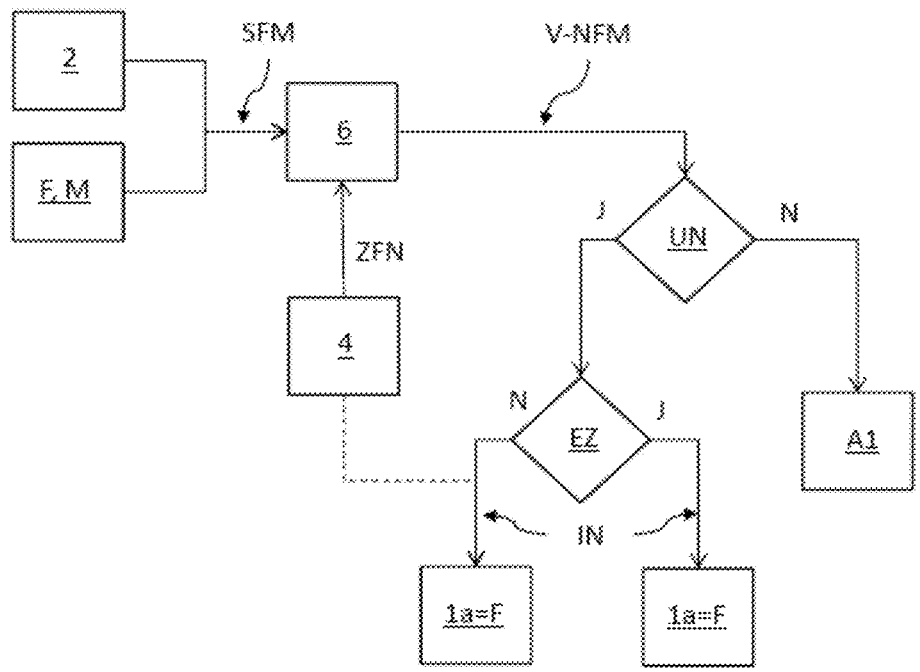
FIG. 5 illustrates another embodiment of the identification of the driver of a vehicle.

FIG. 5 illustrates another embodiment of the identification of the driver of a vehicle. For this purpose, the data of the authorized drivers F and passengers M is stored SFM for each of the vehicles 2 in the vehicle server 6, and this data is made available in the system for purposes of a user/driver analysis. To this end, the vehicle server 6 is connected at least to the database 4. The users 1 of these vehicles 2 who were associated by the analysis server 5 are compared V-NFM to the drivers F and/or passengers M authorized for these vehicles 2, and in this manner, the vehicle server 6 checks whether the vehicle 2 was driven by an authorized user. In case of a correspondence (UN=J) of only one of the associated users 1a with one of the authorized drivers F and/or passengers M for this vehicle 2 (unambiguous association EZ=J), this user 1a is indicated IN as being the driver F of the vehicle 2. The indication IN can be stored in the database 4 and/or in the vehicle server 6. In case of several correspondences (UN=J) between associated users 1a, 1b, 1c and authorized drivers F and/or passengers M (unambiguous association EZ=N) for this vehicle 2, the user 1a whose individual movement route TR1 displays the greatest correspondence U-FT with the individual travel route FR of the vehicle 2 is indicated IN as the driver F. In case there is no correspondence (UN=N) between associated users 1a, 1b, 1c and authorized drivers F and/or passengers M, or in case there is not a sufficient correspondence U-FT with the individual movement routes TR1, TR2, TR3, TR4 for this vehicle 2, a first alarm signal A1 is sent to the system. On the one hand, this first alarm signal A1 can be used to inform the authorized driver F of his/her obligation to drive the vehicle 2, or on the other hand, the alarm signal A1—in conjunction with the result of the comparison V-NFM by the analysis server 5 and the absence of a correspondence of users 1 with the travel route FR—can be assessed as an indication of theft of the vehicle 2. The system operator can then take the appropriate steps in response to the first alarm signal A1. The first alarm signal A1 can be sent acoustically, visually or by an appropriate automatic electronic notification to the relevant sites in the system. The result of the comparison V-NFM is stored SV6 in the system, for example, in the vehicle server 6.

Figure 6:
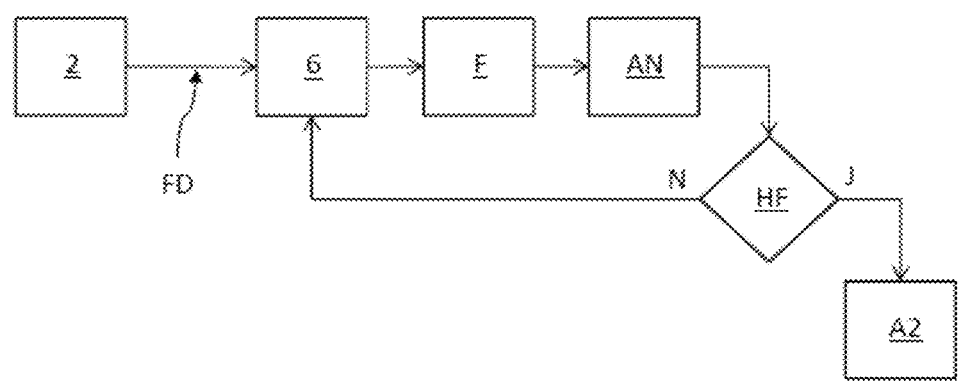
FIG. 6 illustrates another embodiment of the evaluation of the driving data.

FIG. 6 illustrates another embodiment of the evaluation of the driving data. Here, the vehicle 2 is equipped with one or more driving sensors 24, preferably acceleration sensors 24, that send the driving data FD to the vehicle module 21. The vehicle module 21 transmits UF this driving data FD, together with the appertaining position and time data F-OZ in parallel or in a shared data packet, to the system, here the vehicle server 6. After the transmission of the driving data FD, the vehicle server 6 (or else as an alternative, the analysis server 5) analyzes AN the driving data to check whether the previously defined maximum values HF have been exceeded, for example, by making a comparison with map material stored in the vehicle server 6 and the speed limits stored there for certain street or road sections, and, if applicable, associates the exceeding of the maximum values with the driver F indicated IN for this vehicle 2. Here, the association can be carried out before the analysis or in the opposite order. In case an acceleration sensor is used as the driving sensor 24 and in case of a defined maximum value HF for a maximum negative acceleration, the vehicle server 6 can send a second alarm signal A2 to the system if this maximum negative acceleration HF has been exceeded, whereby the second alarm signal A2 encompasses the users 1, 1a, 1b, 1c associated with this vehicle 2 and, if applicable, the indicated IN driver F. The maximum values HF of negative accelerations can correspond, for example, to those for deploying the airbags in vehicles 2. These negative accelerations are interpreted as an accident situation. Thus, if such an acceleration value is ascertained, an accident of the vehicle 2 can be detected. In response to the received second alarm signal A2, the system operator is able to inform the appropriate emergency services or police in order to initiate further emergency and rescue measures. In addition, the emergency services can be given additional information such as, for example, the number of persons (corresponds to the number of associated users 1 for this travel route FR) in the vehicle 2 as well as the identity of the driver F for this vehicle 2. The second alarm signal can be sent acoustically, visually or by an appropriate automatic electronic notification to the relevant sites in the system. The result of the comparison V-NFM is stored SV6 in the system, for example, in the vehicle server 6.

Figure 7:
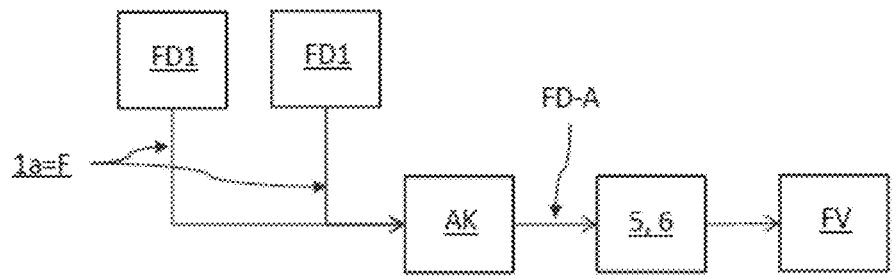
FIG. 7 another embodiment of the evaluation of the driving data.

FIG. 7 another embodiment of the evaluation of the driving data. Here, the driving data FD1, FD2 that is associated with the user 1a as the identified driver F and that was acquired, for example, during a first and second trip of the user 1a with one or more vehicles 2, is collected AK in the vehicle server 6 or in the analysis server 5 for this user 1a, and, on the basis of the collected driving data FD-A, a specific driving behavior FV is determined for the user 1a as the identified driver F. The example shown here with two sets of driving data FD1, FD2 is not limited to just two sets of driving data FD1, FD2. The more sets of driving data FD1, FD2, . . . that can be collected AK for a certain user 1a, the more precisely the driving behavior FV can be determined. Therefore, the system is configured to collect AK all of the already available and later added driving data FD1, FD2, . . . that can be associated with a certain user 1a, whereby the driving data that is added later to an already determined driving behavior FV is used to render the driving behavior FV data more precise or to update it. Therefore, this is a self-learning system based on the driving history from the driving data of each driver. This user-specific driving behavior FV can be utilized, for example, to identify driving risks for certain users or for other statistical evaluations such as, for example, a cost-efficient driving style.

Figure 8:
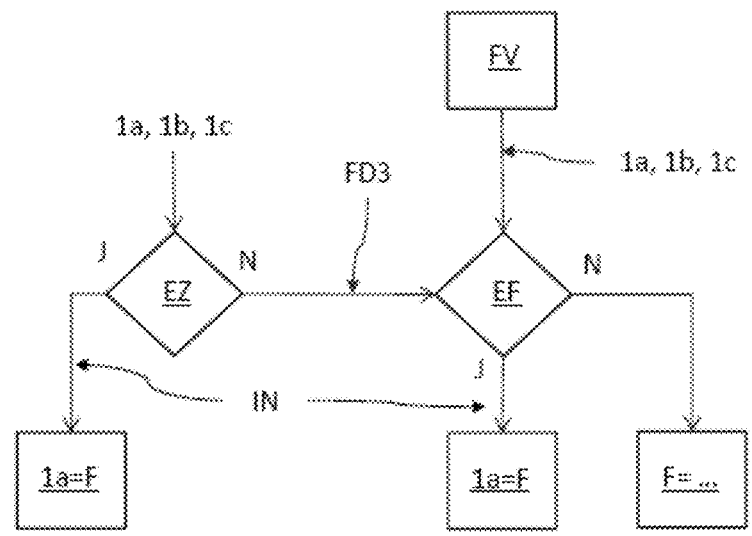
FIG. 8 another embodiment of the identification of the driver on the basis of the driving data.

FIG. 8 another embodiment of the identification of the driver on the basis of the driving data. If only one user 1a is a possibility as the driver F (EZ=J), the driver F is identified as already described in reference to FIG. 5. However, if, for instance, as shown in this embodiment, there are sufficient correspondences of the travel route with the individual movement routes of the users 1a, 1b, 1c, then all of these users 1a, 1b, 1c are possibilities as the driver or passengers in the vehicle 2 with the driving data FD3. In order to be able to make a more well-founded identification IN of the driver F from the group of users 1a, 1b, 1c as possible drivers or passengers, the appertaining driving data FD3 is compared EF to the driving behavior FV available in each case for the users 1a, 1b, 1c. For example, the user 1a is identified IN as the driver when the degree of correspondence of his/her driving behavior FV with the driving data FD3 is the greatest. After the identification IN of the user 1a as the driver F on the trip with the driving data FD3, this driving data FD3 is added to the already collected driving data FD-A in order to generate an updated driving behavior FV for this user 1a. In a preferred embodiment, the degree of correspondence is only evaluated if the degree of correspondence is above a driving data threshold value. In this case (arrow EF=N), an identification IN of the driver F can be made on the basis of other criteria, for example, as described with reference to FIG. 5. In another embodiment, the previously determined driving behavior FV for a user 1a who was identified as the driver F is used for another trip with a vehicle 2 in order to make a comparison of the driving behavior with the driving data FD3 of this most recent trip in order to verify the identification IN made of the user 1a as the driver F. The system can ascertain that the verification was successful, for example, when the degree of correspondence between the current driving behavior FV and the most recent driving data FD3 is above a previously defined driving data threshold value. In the cases described above, the driving data FD3 is used to update the driving behavior FV for the user 1a.

The embodiments shown here are only examples and must not be construed in a limiting manner. Alternative embodiments envisaged by the person skilled in the art are likewise encompassed by the scope of protection of the present disclosure.

What is claimed is:

1. A system for determining the number and the identity of users in a vehicle, comprising:
   at least one vehicle with an associated individual vehicle ID and with a vehicle module for the wireless transmission of vehicle-specific position and time data to the system;
   at least one mobile telecommunications network comprising:
      a network server; and
      several mobile terminals suitable for communication at least in the mobile telecommunications network, wherein individual terminal IDs are associated with each of the mobile terminals, and users of the mobile terminals are identifiable on the basis of the terminal ID, the network server is to transmit terminal-specific position and time data to the system;
   one or more data storage units to store the vehicle-specific position and time data together with the vehicle ID in order to ascertain the individual travel route of the at least one vehicle, and in order to store the terminal-specific position and time data, together with the terminal IDs and also personal data of the users associated with the terminal IDs in order to ascertain individual person-specific movement routes for each of the mobile terminals; and
   an analysis server to:
      access the one or more data storage units and to compare the ascertained individual travel route to the ascertained individual movement routes, and, in case of sufficient correspondence of at least one of the individual travel routes with one or more of the individual movement routes, at least over a given time interval; and
      link the appertaining vehicle ID with the terminal IDs belonging to these individual movement routes, and to store this in the data storage unit or units, together with the personal data of the users associated with the terminal IDs.

2. The system according to claim 1, wherein the correspondence is only sufficient if the ascertained degree of correspondence is above a defined threshold value.

3. The system according to claim 2, wherein, when it comes to ascertaining the degree of correspondence, the time and position correspondence of the starting and ending points of the individual travel route and the individual movement routes that are to be compared to it are given a higher weighting than points of the travel and movement routes between the starting and ending points.

4. The system according to claim 1, wherein the system comprises a vehicle server which is connected at least to the data storage unit or units and on which at least the drivers and/or passengers that are authorized for the at least one vehicle are stored.

5. The system according to claim 4, wherein the vehicle module transmits the position and time data to the vehicle server, and the individual travel route of the at least one vehicle is determined by the vehicle server.

6. The system according to claim 4, wherein the vehicle server is configured so that the users associated with at least one vehicle via the analysis server can be compared to the drivers and/or passengers authorized for this vehicle, after which the vehicle server can then store the result of the comparison and, in case of a correspondence between only one of the associated users with one of the authorized drivers and/or passengers for the vehicle, to indicate this one user as the driver of this vehicle.

7. The system according to claim 6, wherein the vehicle server is designed to send a first alarm signal to the system if there is no correspondence between associated users and authorized drivers and/or passengers, or if there is not a sufficient correspondence with individual movement routes for this vehicle.

8. The system according to claim 6, wherein the vehicle server is designed so that, if there are several correspondences between associated users and authorized drivers and/or passengers for this vehicle, the user whose individual movement route displays the greatest level of correspondence with the individual travel route of the vehicle is indicated as the driver.

9. The system according to claim 1, wherein the mobile telecommunications network is configured to trigger the transmission of terminal-specific position and time data from the mobile terminals to the network server, or in that an application is installed on the mobile terminal that triggers the transmission of terminal-specific position and time data to the network server.

10. The system according to claim 1, wherein driving data is acquired from the vehicle-specific position and time data and/or in that the vehicle is equipped with one or more driving sensors, preferably acceleration sensors, that send the driving data to the vehicle module, and the vehicle module transmits this driving data, together with the appertaining position and time data, to the system.

11. The system according to claim 10, wherein the analysis server and/or the vehicle server are configured to associate the driving data with the user who has been identified as the driver, to collect the driving data for all trips of this user, to determine a specific driving behavior for the user on the basis of the collected driving data, and to use the specific driving behavior to identify a specific user as the driver from among a group of several users who could possibly be the drivers and/or to verify the identification of one of the users as the driver.

12. A method for operating a system, wherein the system comprises at least one vehicle with an associated individual vehicle ID and with a vehicle module, at least one mobile telecommunications network with a network server and several mobile terminals that are suitable for communication at least in the mobile telecommunications network, one or more data storage units, and an analysis server, the method comprising:
registering authorized drivers and/or passengers in the system with personal data and terminal IDs associated with the mobile terminals of the drivers and/or passengers;
transmitting vehicle-specific position and time data to the system via the vehicle module;
transmitting terminal-specific position and time data via the network server to the system, whereby individual terminal IDs are associated with each of the mobile terminals, and the users of the mobile terminals can be identified on the basis of the individual terminal IDs;
storing the vehicle-specific position and time data, together with the vehicle ID for the at least one vehicle, and storing the terminal-specific position and time data, together with the terminal IDs as well as the personal data of the users associated with the terminal IDs for each of the mobile terminals, in one or more data storage units;
ascertaining the individual travel route and the individual person-specific movement routes on the basis of the stored vehicle-specific position and time data and of the terminal-specific position and time data;
comparing the ascertained individual travel route to the ascertained movement routes in an analysis server;
linking the vehicle ID of the at least one vehicle to one or more terminal IDs in case of a sufficient correspondence at least during a certain time interval between the individual travel route associated with the vehicle ID and the individual movement routes associated with the one or more terminal IDs; and
storing the linking of the vehicle ID with the terminal IDs, together with the personal data of the users associated with the terminal IDs, in the data storage unit or units.

13. The method according to claim 12, comprising:
storing authorized drivers and/or passengers for the at least one vehicle in a vehicle server that is at least connected to the data storage unit or units;
comparing the users of this vehicle that have been associated via the analysis server with the drivers and/or passengers authorized for this vehicle, and storing the result of the comparison.

14. The method according to claim 13, comprising:
in case there is a correspondence of only one of the associated users with one of the authorized drivers and/or passengers for this vehicle, the vehicle server indicates this one user as the driver of this vehicle;
in case there is not a correspondence between associated users and authorized drivers and/or passengers or not a sufficient correspondence with individual movement routes for this vehicle, a first alarm signal is sent to the system; or
in case there are several correspondences between associated users and authorized drivers and/or passengers for this vehicle, the user whose individual movement route displays the greatest correspondence with the individual travel route for the vehicle is indicated as the driver of this vehicle.

15. The method according to claim 14, comprising the additional steps:
analyzing the acquired driving data in the vehicle server or in the analysis server; and
associating the driving data with the driver indicated for this vehicle, preferably, the method additionally comprises other steps, namely, that the associated driving data is collected for the identified user as the driver for all trips of this user and, on the basis of the collected driving data, a specific driving behavior is determined for the identified user, whereby the specific driving behavior is used to identify one of the users as the driver and/or to verify the identification of one of the users as the driver.

* * * * *